J. TAYLOR.
Churn.
No. 25,453.
Patented Sept. 13, 1859.
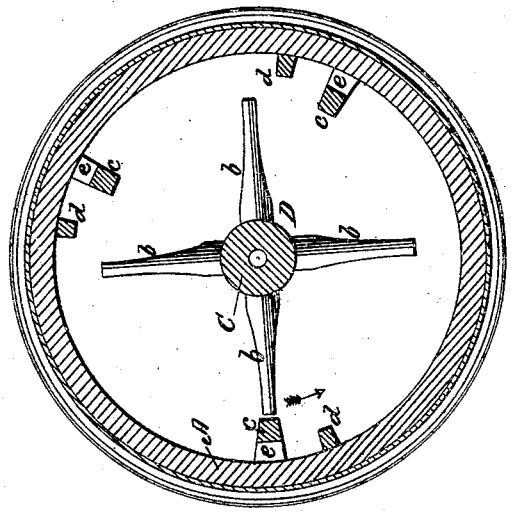
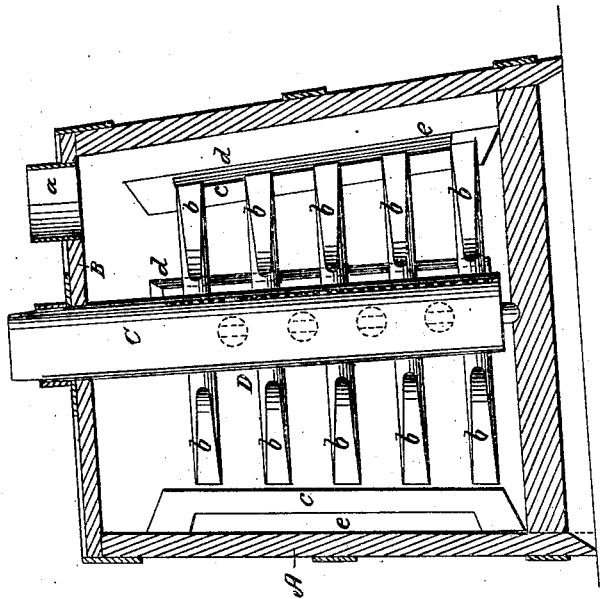
Witnesses:
Looney M D
W. H. H. Moon
Inventor:
James Taylor

UNITED STATES PATENT OFFICE.

JAMES TAYLOR, OF RUSHVILLE, ILLINOIS.

CHURN.

Specification of Letters Patent No. 25,453, dated September 13, 1859.

*To all whom it may concern:*

Be it known that I, JAMES TAYLOR, of Rushville, in the county of Schuyler and State of Illinois, have invented a new and Improved Churn; and I do hereby declare that the following is a full, clear, and exact description of the same, reference being had to the accompanying drawings, forming a part of this specification, in which—

Figure 1 represents a vertical central section of my improved churn. Fig. 2 is a horizontal section of ditto.

Similar letters of reference in both views indicate corresponding parts.

I am aware that perforated brakes placed vertically on the inner side of the churn are not new. I am also aware that perforated brakes placed at the corners of a churn are common, and therefore my invention only consists in a peculiar construction and arrangement of perforated brakes and auxiliary reflectors in combination with a dasher having its blades flattened out gradually from near the shaft to their ends; whereby the cream is powerfully agitated, and moves out toward the sides of the churn, and there broken up and deflected or thrown back again toward the center. With this arrangement, the cream is not only reduced to butter in a short time, but with ease and very little labor.

To enable those skilled in the art to fully understand, make and use my invention I will proceed to describe its construction and operation.

A represents the tub or barrel which is constructed, in the usual manner, of wood and strengthened by suitable hoops, and the upper one of these hoops projects sufficiently beyond the top edge of the barrel so as to form a socket for the cover, B, which, however, may be secured to the top of the barrel in any other suitable manner. This cover is provided with a hole in its center, through which the shaft, C, of the dasher, D, passes and this shaft steps into a socket in the center of the bottom of the churn. The cover may be made of two parts so that it can be taken off and put on with more ease and an aperture, $a$, in the same serves to admit air to the inside of the churn when the same is in operation.

The dasher, D, is constructed of a series of horizontal bars, $b$, which are flattened out toward their ends so that when the dasher is rotated, it creates a powerful current of the cream or milk and still it is quite easy to rotate the same. These bars do not, however extend fully up to the sides of the tub or barrel, A, and sufficient room is left for a series of brakes, $c$, and ledges, $d$, of different width and construction, which serve to break the current of the cream or milk in various directions. The brakes, $c$, are wider than the ledges, $c$, and about one third of the same is cut out so as to leave openings, $e$, close to the sides of the tub, and the bars, $b$, of the dasher pass close by these brakes. The narrower ledges, $c$, are secured at a small distance from the brakes and they serve to turn the current of the cream from the sides of the tube toward the dasher. The number and size of these brakes and ledges depend entirely upon the size and diameter of the tub, it is not, however, necessary to have a great number and they may be put at a considerable distance one from the other as clearly represented in Fig. 2.

The operation is as follows:—The tub is filled with milk or cream to the height of the upper one of the bars, $b$, of the dasher, and the dasher is rotated in the direction of the arrow (Fig. 2), and by the action of the dasher the mass of cream or milk in the tub is caused to assume a rotary motion, and the current thus created by coming in contact with the brakes, $c$, is thrown violently against the sides of the tub and as it passes through the openings, $e$, in the back part of these brakes and along the sides of the tub, it (the current) strikes against the ledges, $d$, whereby it is turned in again, toward the dasher, and by this method of breaking the current the cream is reduced into butter in quite a short time, and, furthermore it is quite easy to operate this churn, as in no case the current is broken in such a manner as to directly oppose the motion of the dasher.

I do not claim perforated brakes or solid brakes placed vertically against the inside of the churn barrel in the manner exhibited in the rejected application of Hiram Brown 1852. Nor do I claim perforated brakes placed vertically at the corners of the churn in the manner shown in the patent of M. R. Marcell 1858, but What I do claim as my invention and desire to secure by Letters Patent, is—

5. The peculiar construction and arrangement of perforated brakes and auxiliary reflectors in combination with a dasher having its blades flattened out gradually from near the shaft to their ends, substantially as and for the purposes set forth.

JAMES TAYLOR.

Witnesses:
 J. SWEENEY,
 W. H. H. MOORE.